United States Patent
Li et al.

(10) Patent No.: US 10,542,553 B2
(45) Date of Patent: Jan. 21, 2020

(54) METHOD FOR SCHEDULING COMMUNICATION RESOURCE, TERMINAL DEVICE AND BASE STATION

(71) Applicant: BEIJING SPREADTRUM HI-TECH COMMUNICATIONS TECHNOLOGY CO., LTD., Beijing (CN)

(72) Inventors: Weicheng Li, Shanghai (CN); Zhengang Pan, Shanghai (CN)

(73) Assignee: BEIJING SPREADTRUM HI-TECH COMMUNICATIONS TECHNOLOGY CO., LTD., Beijing (CN)

( * ) Notice: Subject to any disclaimer, the term of this patent is extended or adjusted under 35 U.S.C. 154(b) by 182 days.

(21) Appl. No.: 15/406,020

(22) Filed: Jan. 13, 2017

(65) Prior Publication Data
US 2017/0290026 A1 Oct. 5, 2017

(30) Foreign Application Priority Data

Apr. 1, 2016 (CN) .......................... 2016 1 0204640

(51) Int. Cl.
*H04W 72/12* (2009.01)
*H04W 72/04* (2009.01)
(52) U.S. Cl.
CPC ........... *H04W 72/12* (2013.01); *H04W 72/04* (2013.01)
(58) Field of Classification Search
CPC ........... H04W 72/0413; H04W 72/048; H04W 72/1289; H04W 74/0833
See application file for complete search history.

(56) References Cited

U.S. PATENT DOCUMENTS 8,804,665 B2 * 8/2014 Kim ................. H04W 72/0406
370/331
8,837,391 B2 * 9/2014 Seo ....................... H04L 1/1671
370/329
(Continued)

FOREIGN PATENT DOCUMENTS

CN  101473564 A  7/2009
CN  102932924 A  2/2013
(Continued)

OTHER PUBLICATIONS

Summary of the First CN Office Action corresponding to Application No. 201610204640.3; dated May 4, 2018.

*Primary Examiner* — Khaled M Kassim
*Assistant Examiner* — Berhanu D Belete
(74) *Attorney, Agent, or Firm* — Cantor Colburn LLP

(57) ABSTRACT

Method for scheduling communication resource, terminal device and base station are provided. The method includes: a terminal transmitting an access request message indicating that the terminal has a demand on transmitting data with a short time delay to a base station; receiving a first allocation message which is generated based on the access request message and includes information of a first SR resource from the base station; transmitting a scheduling request of the data with the short time delay to the base station using the first SR resource; receiving a second allocation message which is determined based on the first SR resource and includes information of a resource for transmitting the data with the short time delay from the base station; and transmitting the data with the short time delay based on the allocated resource. Interaction between base station and terminal is reduced to decrease time delay in data transmission.

12 Claims, 3 Drawing Sheets

(56) References Cited

U.S. PATENT DOCUMENTS

| | | | | |
|---|---|---|---|---|
| 2007/0291708 A1* | 12/2007 | Rao | ............... | H04W 28/06 370/338 |
| 2007/0291719 A1* | 12/2007 | Demirhan | ............... | H04W 74/008 370/338 |
| 2009/0316811 A1* | 12/2009 | Maeda | ............... | H04W 76/11 375/260 |
| 2011/0164587 A1* | 7/2011 | Seo | ............... | H04L 1/1671 370/329 |
| 2012/0122465 A1 | 5/2012 | Landstrom et al. | | |
| 2012/0124196 A1* | 5/2012 | Brisebois | ............... | H04W 76/38 709/224 |
| 2012/0281566 A1* | 11/2012 | Pelletier | ............... | H04W 76/27 370/252 |
| 2013/0081026 A1* | 3/2013 | Malkamaki | ............... | H04L 5/0044 718/102 |
| 2013/0301446 A1 | 11/2013 | Chen et al. | | |
| 2014/0133447 A1* | 5/2014 | Moulsley | ............... | H04W 72/1278 370/329 |
| 2014/0135027 A1* | 5/2014 | Kodali | ............... | H04W 72/1278 455/452.1 |
| 2014/0223053 A1* | 8/2014 | Yoshida | ............... | G06F 13/1689 710/110 |
| 2014/0328289 A1* | 11/2014 | Kim | ............... | H04W 72/0406 370/329 |
| 2015/0049697 A1 | 2/2015 | Worrall et al. | | |
| 2015/0067100 A1* | 3/2015 | Peake | ............... | H04L 67/1097 709/217 |
| 2015/0189645 A1* | 7/2015 | Maeda | ............... | H04W 76/11 370/336 |
| 2015/0341824 A1* | 11/2015 | Ge | ............... | H04W 48/02 370/230 |
| 2016/0014790 A1* | 1/2016 | Takehana | ............... | H04W 72/085 370/329 |
| 2016/0249347 A1* | 8/2016 | Kim | ............... | H04W 72/0406 |
| 2018/0249470 A1* | 8/2018 | Seo | ............... | H04W 72/0493 |

FOREIGN PATENT DOCUMENTS

| | | |
|---|---|---|
| CN | 103428879 A | 12/2013 |
| CN | 104170491 A | 11/2014 |
| CN | 104378830 A | 2/2015 |
| EP | 2731392 A1 | 5/2014 |
| WO | 2014002075 A2 | 1/2014 |

* cited by examiner

METHOD FOR SCHEDULING COMMUNICATION RESOURCE, TERMINAL DEVICE AND BASE STATION

CROSS-REFERENCE TO RELATED APPLICATIONS

The present application claims priority to Chinese patent application No. 201610204640.3, filed on Apr. 1, 2016, and entitled "METHOD FOR SCHEDULING COMMUNICATION RESOURCE, TERMINAL DEVICE AND BASE STATION", and the entire disclosure of which is incorporated herein by reference.

TECHNICAL FIELD

The present disclosure generally relates to communication field, and more particularly, to a method for scheduling communication resource, a terminal device and a base station.

BACKGROUND

In communication systems, when a terminal has a data transmission demand, it should transmit a scheduling request, so that a base station can allocate resources to the terminal for data transmission, such as transmission of uplink data or transmission of Device to Device (D2D) data.

However, in existing techniques, to enable the base station to allocate data transmission resources to the terminal, a relatively long interaction procedure between the base station and the terminal is required. In a scenario which has strict requirement on time delay, such as Vehicle to Vehicle (V2V) communication in Vehicle Ad-hoc Network (VANET), existing methods hardly meet the requirements on time delay. Besides, frequent interaction between the base station and the terminal may cause great burden to the scheduling of transmission resources.

Therefore, a new scheduling method is required. In communication scenarios which require a short time delay, interaction between the base station and the terminal should be reduced to decrease the time delay generated in scheduling of resources.

SUMMARY

In embodiments of the present disclosure, in communication scenarios which require a short time delay, interaction between a base station and a terminal may be reduced to decrease a time delay generated in scheduling of resources.

In an embodiment of the present disclosure, a method for scheduling communication resource is provided, including: a terminal transmitting an access request message to a base station, wherein the access request message indicates that the terminal has a demand on transmitting data with a short time delay; receiving a first allocation message from the base station, wherein the first allocation message is generated based on the access request message and includes information of a first scheduling request resource; transmitting a scheduling request of the data with the short time delay to the base station using the first scheduling request resource; receiving a second allocation message from the base station, wherein the second allocation message is determined based on the first scheduling request resource and includes information of a resource for transmitting the data with the short time delay which is allocated by the base station; and transmitting the data with the short time delay based on the resource allocated in the second allocation message.

Optionally, the method may further include: determining whether data to be transmitted is the data with the short time delay; and if it is determined that the data to be transmitted is the data with the short time delay, transmitting the scheduling request of the data with the short time delay to the base station using the first scheduling request resource.

Optionally, the first allocation message may further include information of a second scheduling request resource that is used for transmitting a scheduling request of common data.

Optionally, the information of the first scheduling request resource may include a first period which is a period of transmitting a schedule request using the first scheduling request resource, and the information of the second scheduling request resource may include a second period which is a period of transmitting a schedule request using the second scheduling request resource, wherein the first period is shorter than the second period.

Optionally, the method may further include: determining whether the data to be transmitted is the data with the short time delay or the common data; if it is determined that the data to be transmitted is the common data, transmitting a scheduling request of the common data to the base station using the second scheduling request resource; receiving a third allocation message from the base station, wherein the third allocation message is determined based on the second scheduling request resource and includes information of a resource for transmitting a Buffer Status Report (BSR); transmitting the BSR to the base station based on the third allocation message, wherein the BSR indicates a service type of the common data to be transmitted by the terminal; receiving a fourth allocation message from the base station, wherein the fourth allocation message is generated based on the BSR and includes information of a resource for transmitting the common data which is allocated by the base station; and transmitting the common data based on the resource allocated in the fourth allocation message.

In an embodiment of the present disclosure, a method for scheduling communication resource is provided, including: receiving an access request message from a terminal, wherein the access request message indicates that the terminal has a demand on transmitting data with a short time delay; generating and transmitting a first allocation message to the terminal based on the access request message, wherein the first allocation message includes information of a first scheduling request resource for transmitting a scheduling request of the data with the short time delay; receiving a scheduling request from the terminal; if it is determined that the scheduling request is transmitted using the first scheduling request resource, allocating a resource for transmitting the data with the short time delay to the terminal, and generating a second allocation message including the allocated resource for transmitting the data with the short time delay; and transmitting the second allocation message to the terminal.

Optionally, the first allocation message may further include information of a second scheduling request resource that is used for transmitting a scheduling request of common data.

Optionally, the information of the first scheduling request resource may include a first period which is a period of transmitting a schedule request using the first scheduling request resource, and the information of the second scheduling request resource may include a second period which is a period of transmitting a schedule request using the second scheduling request resource, wherein the first period is shorter than the second period.

Optionally, the method may further include: if it is determined that the scheduling request received from the terminal is transmitted using the second scheduling request resource, generating and transmitting a third allocation message to the terminal, wherein the third allocation message includes information of a resource for transmitting a BSR; receiving the BSR from the terminal, wherein the BSR indicates a service type of the common data to be transmitted by the terminal; and generating and transmitting a fourth allocation message to the terminal based on the BSR, wherein the fourth allocation message includes information of a resource for transmitting the common data.

In an embodiment of the present disclosure, a terminal device is provided, including: a first transmitting circuitry configured to transmit an access request message to a base station, wherein the access request message indicates that the terminal device has a demand on transmitting data with a short time delay; a first receiving circuitry configured to receive a first allocation message from the base station, wherein the first allocation message is generated based on the access request message and includes information of a first scheduling request resource; a second transmitting circuitry configured to transmit a scheduling request of the data with the short time delay to the base station using the first scheduling request resource; a second receiving circuitry configured to receive a second allocation message from the base station, wherein the second allocation message is determined based on the first scheduling request resource and includes information of a resource for transmitting the data with the short time delay which is allocated by the base station; and a third transmitting circuitry configured to transmit the data with the short time delay based on the resource allocated in the second allocation message.

Optionally, the terminal device may further include a determining circuitry, configured to determine whether data to be transmitted is the data with the short time delay, and the second transmitting circuitry is configured to: if it is determined that the data to be transmitted is the data with the short time delay, transmit the scheduling request of the data with the short time delay to the base station using the first scheduling request resource.

Optionally, the first allocation message may further include information of a second scheduling request resource that is used for transmitting a scheduling request of common data.

Optionally, the information of the first scheduling request resource may include a first period which is a period of transmitting a schedule request using the first scheduling request resource, and the information of the second scheduling request resource may include a second period which is a period of transmitting a schedule request using the second scheduling request resource, wherein the first period is shorter than the second period.

Optionally, the terminal device may further include a determining circuitry, configured to determine whether the data to be transmitted is the data with the short time delay or the common data, the second transmitting circuitry is configured to: if it is determined that the data to be transmitted is the common data, transmit a scheduling request of the common data to the base station using the second scheduling request resource, and the terminal device may further include: a third receiving circuitry configured to receive a third allocation message from the base station, wherein the third allocation message is determined based on the second scheduling request resource and includes information of a resource for transmitting a BSR; a fourth transmitting circuitry configured to transmit the BSR to the base station based on the third allocation message, wherein the BSR indicates a service type of the common data to be transmitted by the terminal device; a fourth receiving circuitry configured to receive a fourth allocation message from the base station, wherein the fourth allocation message is generated based on the BSR and includes information of a resource for transmitting the common data which is allocated by the base station; and a fifth transmitting circuitry configured to transmit the common data based on the resource allocated in the fourth allocation message.

In an embodiment of the present disclosure, a based station is provided, including: a first receiving circuitry configured to receive an access request message from a terminal, wherein the access request message indicates that the terminal has a demand on transmitting data with a short time delay; a first processing circuitry configured to generate a first allocation message based on the access request message, wherein the first allocation message includes information of a first scheduling request resource for transmitting a scheduling request of the data with the short time delay; a first transmitting circuitry configured to transmit the first allocation message to the terminal; a second receiving circuitry configured to receive a scheduling request from the terminal; a determining circuitry configured to determine whether the scheduling request is transmitted using the first scheduling request resource; a second processing circuitry configured to: if it is determined that the scheduling request is transmitted using the first scheduling request resource, allocate a resource for transmitting the data with the short time delay to the terminal, and generate a second allocation message including the allocated resource for transmitting the data with the short time delay; and a second transmitting circuitry configured to transmit the second allocation message to the terminal.

Optionally, the first allocation message may further include information of a second scheduling request resource that is used for transmitting a scheduling request of common data.

Optionally, the information of the first scheduling request resource may include a first period which is a period of transmitting a schedule request using the first scheduling request resource, and the information of the second scheduling request resource may include a second period which is a period of transmitting a schedule request using the second scheduling request resource, wherein the first period is shorter than the second period.

Optionally, the base station may further include: a third processing circuitry configured to: if it is determined that the scheduling request received from the terminal is transmitted using the second scheduling request resource, generate a third allocation message including information of a resource for transmitting a BSR; a third transmitting circuitry configured to transmit the third allocation message to the terminal; a third receiving circuitry configured to receive the BSR from the terminal, wherein the BSR indicates a service type of the common data to be transmitted by the terminal; a fourth processing circuitry configured to generate a fourth allocation message based on the BSR, wherein the fourth allocation message includes information of a resource for transmitting the common data; and a fourth transmitting circuitry configured to transmit the fourth allocation message to the terminal.

Embodiments of the present disclosure may provide following advantages. In the method, the terminal informs the base station that it has a demand on transmitting data with a short time delay through the access request message. The base station allocates the first scheduling request resource for transmitting the scheduling request of the data with the short time delay to the terminal based on the access request message. If the terminal transmits a scheduling request using the first scheduling request resource, the base station can determine that data to be transmitted by the terminal is the data with the short time delay, and directly allocates the resource for transmitting the data with the short time delay to the terminal. In this way, when data to be transmitted is data with a short time delay, interaction between a base station and a terminal during resource scheduling may be reduced to decrease a time delay in data transmission.

Further, the first period corresponding to the first scheduling request resource is short than the second period corresponding to the second scheduling request resource. Accordingly, the terminal transmits the scheduling request of the data with the short time delay more rapidly than the scheduling request of the common data, which may further reduce a time delay in the scheduling.

DETAILED DESCRIPTION

As described in the background, in the existing techniques, to enable the base station to allocate data transmission resources to the terminal, a relatively long interaction procedure between the base station and the terminal is required. Therefore, existing methods hardly satisfy scenarios which have strict requirements on time delay. Embodiments of the present disclosure provide new methods for scheduling communication resource.

In order to clarify the object, solutions and advantages of embodiments of the present disclosure, embodiments of present disclosure will be described clearly in detail in conjunction with accompanying drawings.

Figure 1:
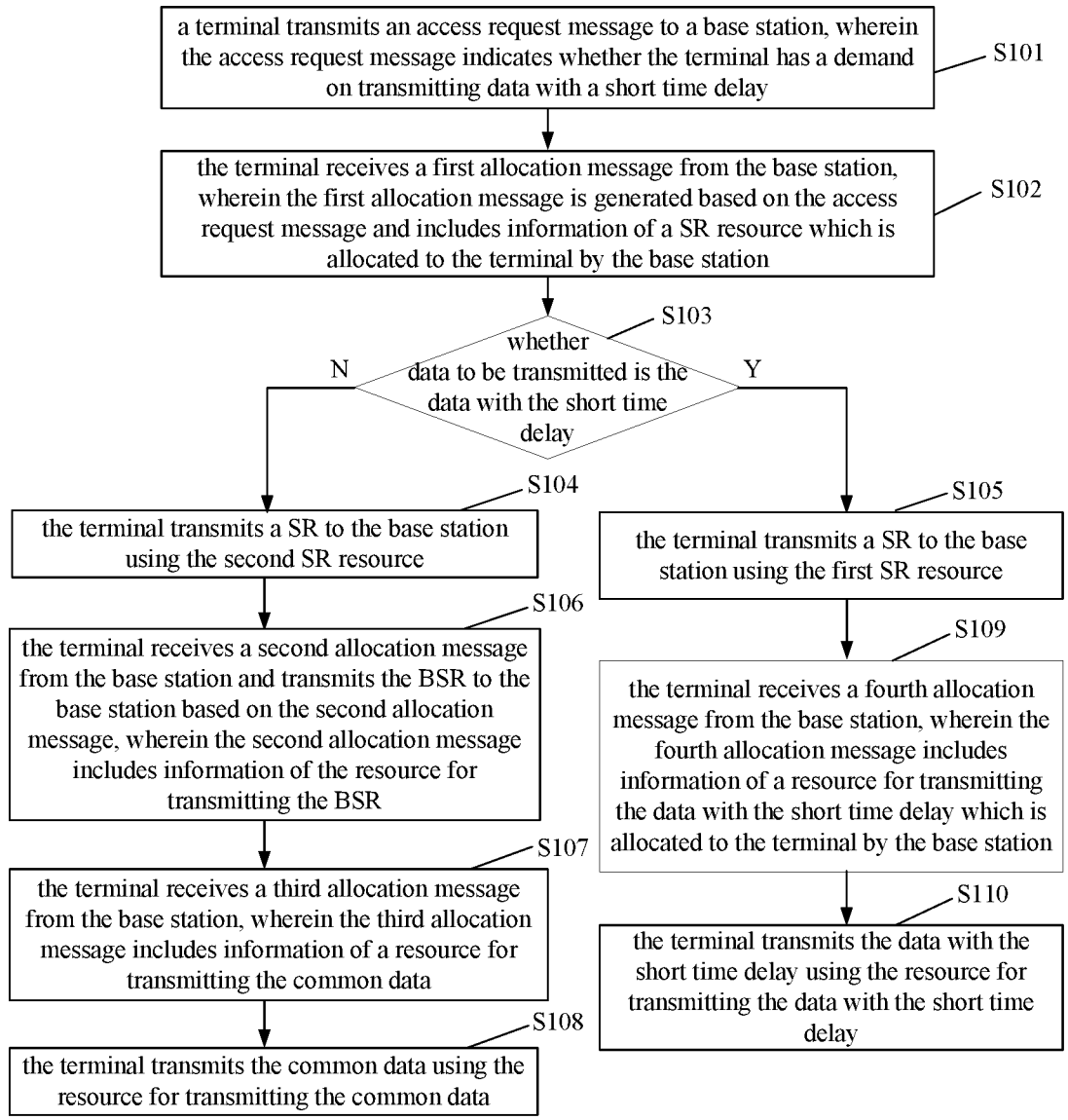
FIG. 1 schematically illustrates a flow chart of a method for scheduling communication resource according to an embodiment.

Referring to FIG. 1, FIG. 1 schematically illustrates a flow chart of a method for scheduling communication resource according to an embodiment. Details of the method are described below.

In S101, a terminal transmits an access request message to a base station, wherein the access request message indicates whether the terminal has a demand on transmitting data with a short time delay.

In some embodiments, the access request message may be a Radio Resource Control (RRC) connection setup request message or an RRC reconfiguration request message transmitted by the terminal during setup of an RRC connection between the terminal and the base station. Through the access request message, the terminal informs the base station whether it has a demand on transmitting data with a short time delay.

In S102, the terminal receives a first allocation message from the base station, wherein the first allocation message is generated based on the access request message and includes information of a Scheduling Request (SR) resource which is allocated to the terminal by the base station.

After receiving the access request message from the terminal, the base station can know whether the terminal has the demand on transmitting the data with the short time delay. If yes, the base station allocates two SR resources to the terminal, one for transmitting a SR of common data, and the other for transmitting a SR of data with the short time delay. If no, the base station may only allocate one SR resource for transmitting the SR of the common data to the terminal. The base station informs the terminal the information of the allocated SR resource through the first allocation message.

In some embodiments, the information of the SR resource may include a transmission time-frequency position, a subframe offset and a period of the SR.

In some embodiments, the terminal has the demand on transmitting the data with the short time delay. Accordingly, the first allocation message includes information of a first SR resource for transmitting a SR of the data with the short time delay and information of a second SR resource for transmitting a SR of the common data. The information of the first SR resource includes a first period which is a period of transmitting a SR using the first SR resource, and the information of the second SR resource includes a second period which is a period of transmitting a SR using the second SR resource. In some embodiments, the first period is shorter than the second period. In this way, a waiting time period required when the terminal transmits the SR of the data with the short time delay is shorter than that required when the terminal transmits the SR of the common data. That is, the terminal transmits the SR of the data with the short time delay more rapidly than the SR of the common data, which may reduce a time delay in the scheduling.

Based on S101 and S102, the terminal acquires required SR resource, and transmits a SR to the base station based on the acquired SR resource, so that the base station can allocate data transmission resource to the terminal to proceed subsequent data transmission, such as transmission of uplink data or transmission of D2D data.

In S103, the terminal determines whether data to be transmitted is the data with the short time delay.

In some embodiments, if it is determined that the data to be transmitted is not the data with the short time delay, i.e., the data to be transmitted is the common data, the method goes to S104, using the second SR resource to transmit a SR to the base station. If it is determined that the data to be transmitted is the data with the short time delay, the method goes to S105, using the first SR resource to transmit a SR to the base station.

In some embodiments, the terminal has the first SR resource for transmitting the SR of the data with the short time delay and the second SR resource for transmitting the SR of the common data. If the data to be transmitted is the common data, the terminal uses the second SR resource to transmit the SR to the base station. If the data to be transmitted is the data with the short time delay, the terminal uses the first SR resource to transmit the SR to the base station.

It should be noted that, in embodiments of the present disclosure, the common data represents data which has no special requirements on time delay, while the data with the short time delay represents data which has requirements on time delay. In some embodiments, data which requires a time delay shorter than or equal to 20 ms are called the data with the short time delay. In some embodiments, the common data may include uplink data and D2D data which has no special requirements on time delay, and the data with the short time delay may include D2D data which requires a short time delay.

In S104, the terminal transmits a SR to the base station using the second SR resource, i.e., transmitting the SR based on a transmission time-frequency position, a sub-frame offset and a period of the second SR resource. After receiving the SR, the base station can know the data to be transmitted by the terminal is the common data, and allocates a resource for transmitting a BSR to the terminal.

In S106, the terminal receives a second allocation message from the base station, and transmits the BSR to the base station based on the second allocation message, wherein the second allocation message includes information of the resource for transmitting the BSR.

Those skilled in the art can know that SR is a preamble which cannot indicate a type of the data to be transmitted by the terminal. The terminal needs to transmit the BSR to the base station to inform a service type of the data to be transmitted.

In some embodiments, the BSR may carry a Logical Channel Identify (LCID) to indicate a service type of the common data to be transmitted, such as uplink data or D2D data. And the base station may allocate corresponding transmission resource to the terminal according to the service type.

In S107, the terminal receives a third allocation message from the base station, wherein the third allocation message includes information of a resource for transmitting the common data.

In some embodiments, the third allocation message may be a Physical Downlink Control Channel (PDCCH) indication message which indicates for the terminal a time-frequency position (including a starting position and the number of resource blocks) of a shared channel where the common data can be transmitted.

In S108, the terminal transmits the common data using the resource for transmitting the common data.

The terminal transmits the common data based on the information of the resource allocated in the third allocation message.

In S105, the terminal transmits a SR to the base station using the first SR resource, i.e., transmitting the SR based on a transmission time-frequency position, a sub-frame offset and a period of the first SR resource. After receiving the SR, the base station can know the data to be transmitted by the terminal is the data with the short time delay. In the embodiment, the data with the short time delay may be D2D data which requires a short time delay. In this case, the base station can know that the data to be transmitted by the terminal is the D2D data rather than uplink data, thus, the base station does not allocate the resource for transmitting the BSR to the terminal, i.e., the terminal does not need to transmit the BSR to the base station, and the method goes to S109.

In S109, the terminal receives a fourth allocation message from the base station, wherein the fourth allocation message includes information of a resource for transmitting the data with the short time delay which is allocated to the terminal by the base station.

In some embodiments, the fourth allocation message may be a PDCCH indication message which indicates for the terminal a time-frequency position (including a starting position and the number of resource blocks) of a shared channel where the data with the short time delay can be transmitted.

In S110, the terminal transmits the data with the short time delay using the resource for transmitting the data with the short time delay.

The terminal transmits the data with the short time delay based on the information of the resource allocated in the fourth allocation message.

From above, after informing the base station that it has the demand on transmitting the data with the short time delay, the terminal receives two SR resources allocated by the base station, the first SR resource for transmitting the SR of the data with the short time delay and the second SR resource for transmitting the SR of the common data. When the data to be transmitted is the data with the short time delay, the terminal transmits a SR to the base station using the first SR resource. After receiving the SR, the base station may allocate a resource for transmitting the data with the short time delay to the terminal based on the first SR resource. And the terminal receives information of the allocated resource and transmits the data with the short time delay using the allocated resource. It can be seen that, when the data to be transmitted is the data with the short time delay, the base station may directly allocate the resource for transmitting the data with the short time delay to the terminal as long as the terminal transmits the SR to the base station, which may reduce interaction between the base station and the terminal, and decrease a time delay.

Figure 2:
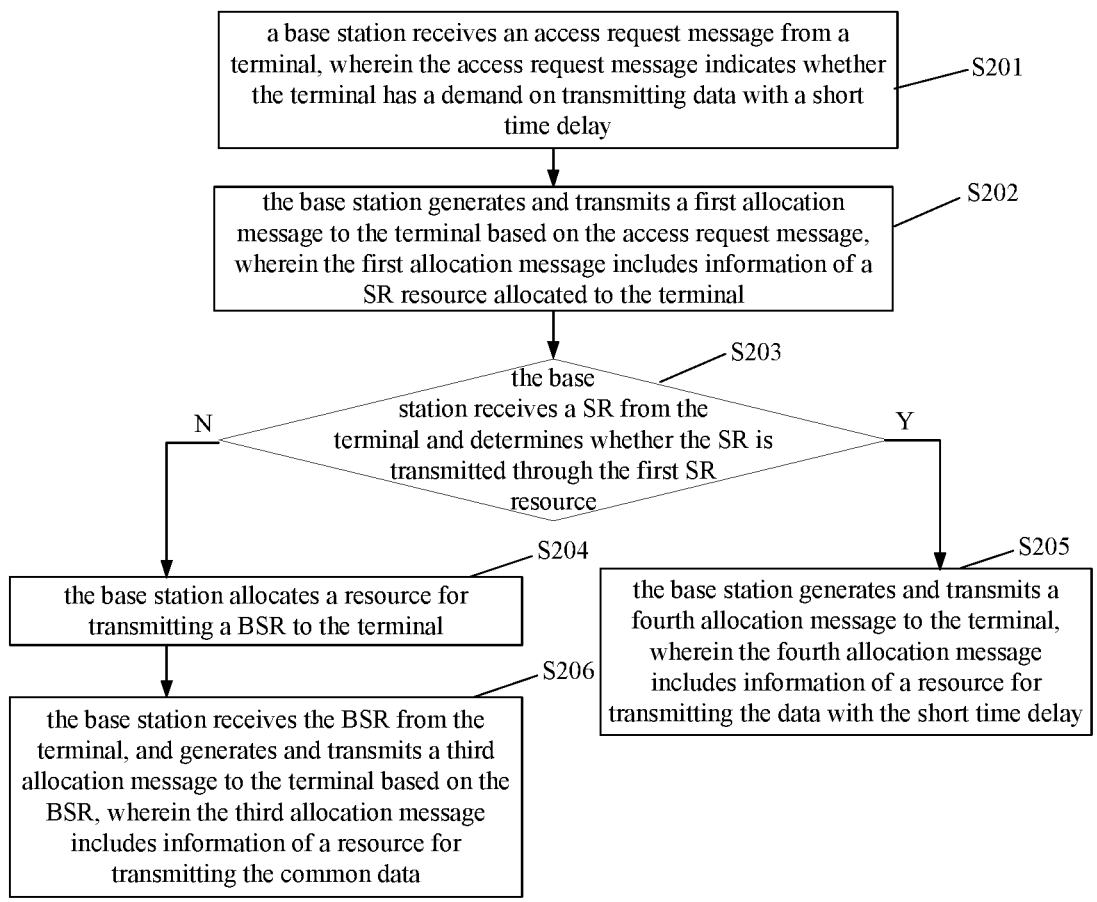
FIG. 2 schematically illustrates a flow chart of a method for scheduling communication resource according to another embodiment.

Referring to FIG. 2, FIG. 2 schematically illustrates a flow chart of a method for scheduling communication resource according to another embodiment. Details of the method are described below.

In S201, a base station receives an access request message from a terminal, wherein the access request message indicates whether the terminal has a demand on transmitting data with a short time delay.

In some embodiments, the access request message may be an RRC connection setup request message or an RRC reconfiguration request message transmitted by the terminal during setup of an RRC connection between the terminal and the base station. Through the access request message, the base station can know whether the terminal has a demand on transmitting data with a short time delay.

In S202, the base station generates and transmits a first allocation message to the terminal based on the access request message, wherein the first allocation message includes information of a SR resource allocated to the terminal.

In some embodiments, the base station may allocate a SR resource to the terminal based on whether the terminal has the demand on transmitting the data with the short time delay, and generate the first allocation message to carry information of the allocated SR resource. In some embodiments, the information of the SR resource may include a transmission time-frequency position, a sub-frame offset and a period of the SR.

If the terminal has the demand on transmitting the data with the short time delay, the base station allocates two SR resources to the terminal, the first SR resource for transmitting SR of data with the short time delay, and the second SR resource for transmitting SR of the common data. If the terminal does not have the demand on transmitting the data with the short time delay, the base station may only allocate one SR resource for transmitting SR of the common data.

In some embodiments, the terminal has the demand on transmitting the data with the short time delay. Accordingly, the first allocation message includes information of the first SR resource and information of the second SR resource. The information of the first SR resource includes a first period which is a period of transmitting a SR using the first SR resource, and the information of the second SR resource includes a second period which is a period of transmitting a SR using the second SR resource. In some embodiments, the first period is shorter than the second period. In this way, the base station allocates a shorter period for the SR of the data with the short time delay, which makes a waiting time period required when the terminal transmits the SR of the data with the short time delay be shorter than that required when the terminal transmits the SR of the common data. That is, the terminal transmits the SR of the data with the short time delay more rapidly than the SR of the common data, which may reduce a time delay in the scheduling.

In some embodiments, the base station may allocate the second SR resource through a following method. A time-frequency position of the second SR resource is allocated in a field sr-PUCCH-ResourceIndex of a signaling SchedulingRequestConfig, and a sub-frame offset and a period of the second SR resource are allocated in a field sr-ConfigIndex of the signaling SchedulingRequestConfig. The fields sr-PUCCH-ResourceIndex and sr-ConfigIndex are existing fields.

In some embodiments, the base station may allocate the first SR resource through a following method. Two new fields may be added in the signaling SchedulingRequestConfig, one for carrying a time-frequency position of the first SR resource, and the other for carrying a sub-frame offset and a period of the first SR resource. It should be noted that, methods for configuring the first SR resource are limited thereto. In some embodiments, fields of other signaling may be used to allocate the first SR resource.

After receiving the first allocation message, the terminal uses the allocated SR resource to transmit the SR to the base station to realize data transmission.

In S203, the base station receives a SR from the terminal and determines whether the SR is transmitted through the first SR resource.

If the SR is not transmitted through the first SR resource, i.e., transmitted through the second SR resource, the method goes to S204; or else, the method goes to S205.

In some embodiments, if the base station acquires the SR at the first SR resource, it indicates that the SR is transmitted through the first SR resource, and the data to be transmitted by the terminal is the data with the short time delay. In some embodiments, if the base station acquires the SR at the second SR resource, it indicates that the SR is transmitted through the second SR resource, and the data to be transmitted by the terminal is the common data.

In S204, the base station allocates a resource for transmitting a BSR to the terminal.

As the SR is a preamble which cannot indicate whether a type of the data to be transmitted by the terminal is uplink data or D2D data. To allocate data transmission resource for the terminal, the base station needs to know the type of the data to be transmitted by the terminal. Therefore, the base station allocates the resource for transmitting the BSR to the terminal, so that the terminal transmits the BSR to the base station through the resource for transmitting the BSR. In some embodiments, the BSR may carry an LCID to indicate a type of the common data to be transmitted, such as uplink data or D2D data.

In S206, the base station receives the BSR from the terminal, and generates and transmits a third allocation message to the terminal based on the BSR, wherein the third allocation message includes information of a resource for transmitting the common data.

In some embodiments, the third allocation message may be a PDCCH indication message which indicates for the terminal a time-frequency position (including a starting position and the number of resource blocks) of a shared channel where the common data can be transmitted. In some embodiments, if it is indicated that the data to be transmitted is uplink data in the BSR, the shared channel may be a Physical Uplink Control Channel (PUCCH); or if it is indicated that the data to be transmitted is D2D data in the BSR, the shared channel may be a Physical Shared Channel (PSCH).

After receiving the third allocation message, the terminal uses the allocated resource in the third allocation message to transmit the common data.

If the SR is transmitted through the first SR resource in S203, the method goes to S205.

In S205, the base station generates and transmits a fourth allocation message to the terminal, wherein the fourth allocation message includes information of a resource for transmitting the data with the short time delay.

In some embodiments, the fourth allocation message may be a PDCCH indication message which indicates for the terminal a time-frequency position (including a starting position and the number of resource blocks) of a shared channel where the data with the short time delay can be transmitted. In some embodiments, the shared channel may be PSCH.

After receiving the fourth allocation message, the terminal uses the allocated resource in the fourth allocation message to transmit the data with the short time delay.

From above, after being informed that the terminal has the demand on transmitting the data with the short time delay, the base station allocates to the terminal two SR resources, the first SR resource for transmitting the SR of the data with the short time delay and the second SR resource for transmitting the SR of the common data. When the terminal transmits the SR to the base station using the first SR resource, the base station knows that the terminal needs to transmit the data with the short time delay, and directly allocates a resource for transmitting the data with the short time delay to the terminal. It can be seen that, when the data to be transmitted by the terminal is the data with the short time delay, the base station does not require the terminal to transmit the BSR, and directly allocates the resource for transmitting the data with the short time delay to the terminal, which may reduce interaction between the base station and the terminal, and decrease a time delay.

Figure 3:
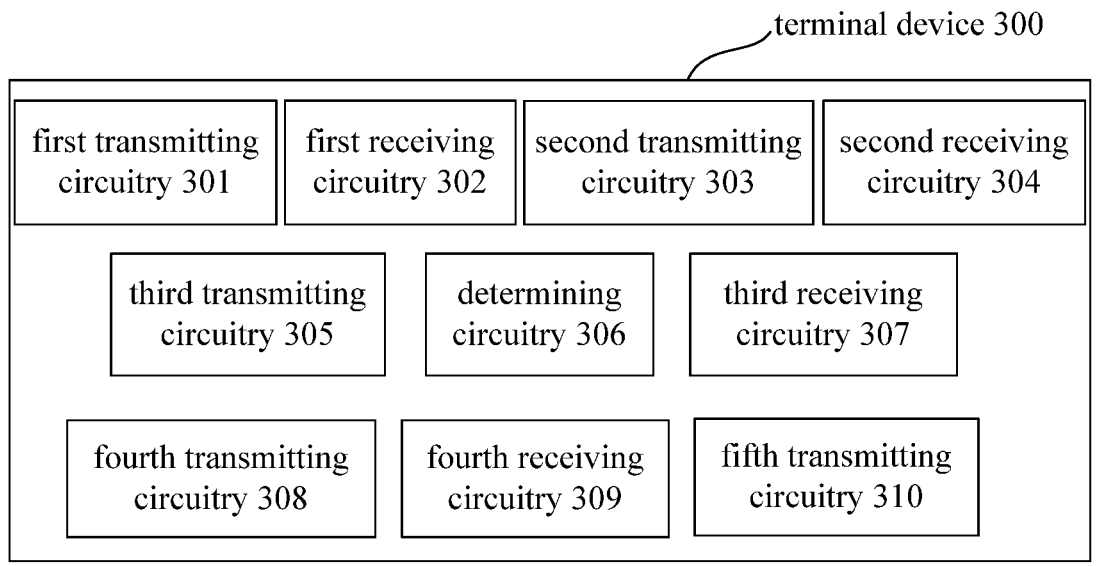
FIG. 3 schematically illustrates a structural diagram of a terminal device according to an embodiment.

Accordingly, in an embodiment, a terminal device is provided. Referring to FIG. 3, the terminal device 300 includes: a first transmitting circuitry 301 configured to transmit an access request message to a base station, wherein the access request message indicates that the terminal device has a demand on transmitting data with a short time delay; a first receiving circuitry 302 configured to receive a first allocation message from the base station, wherein the first allocation message is generated based on the access request message and includes information of a first SR resource; a second transmitting circuitry 303 configured to transmit a SR of the data with the short time delay to the base station using the first SR resource; a second receiving circuitry 304 configured to receive a second allocation message from the base station, wherein the second allocation message is determined based on the first SR resource and includes information of a resource for transmitting the data with the short time delay which is allocated by the base station; and a third transmitting circuitry 305 configured to transmit the data with the short time delay based on the resource allocated in the second allocation message.

In some embodiments, the terminal device 300 may further include a determining circuitry 306, configured to determine whether data to be transmitted is the data with the short time delay, and the second transmitting circuitry 303 is configured to: if it is determined that the data to be transmitted is the data with the short time delay, transmit the SR of the data with the short time delay to the base station using the first SR resource.

In some embodiments, the first allocation message may further include information of a second SR resource that is used for transmitting a SR of common data.

In some embodiments, the determining circuitry 306 may be configured to determine whether the data to be transmitted is the data with the short time delay or the common data, and the second transmitting circuitry 303 may be further configured to: if it is determined that the data to be transmitted is the common data, transmit a SR of the common data to the base station using the second SR resource. The terminal device 300 may further include: a third receiving circuitry 307 configured to receive a third allocation message from the base station, wherein the third allocation message is determined based on the second SR resource and includes information of a resource for transmitting a BSR; a fourth transmitting circuitry 308 configured to transmit the BSR to the base station based on the third allocation message, wherein the BSR indicates a service type of the common data to be transmitted by the terminal device; a fourth receiving circuitry 309 configured to receive a fourth allocation message from the base station, wherein the fourth allocation message is generated based on the BSR and includes information of a resource for transmitting the common data which is allocated by the base station; and a fifth transmitting circuitry 310 configured to transmit the common data based on the resource allocated in the fourth allocation message.

In some embodiments, the first or second SR resource may include a transmission time-frequency position, a subframe offset and a period of the corresponding SR.

In some embodiments, data which requires a time delay shorter than or equal to 20 ms are called the data with the short time delay. In some embodiments, the common data may include uplink data and D2D data which has no requirements on time delay, and the data with the short time delay may include D2D data which requires a short time delay.

In some embodiments, the information of the first SR resource includes a first period which is a period of transmitting a SR using the first SR resource, the information of the second SR resource includes a second period which is a period of transmitting a SR using the second SR resource, and the first period is shorter than the second period.

In some embodiments, if the access request message transmitted to the base station by the first transmitting circuitry 301 indicates that the terminal does not have the demand on transmitting the data with the short time delay, the second allocation message received by the first receiving circuitry 302 only includes the information of the second SR resource.

In some embodiments, the BSR may carry an LCID to indicate a type of the common data to be transmitted, such as uplink data or D2D data.

In some embodiments, the access request message may be an RRC connection setup request message or an RRC reconfiguration request message.

In some embodiments, the second or fourth allocation message may be a PDCCH indication message. The second allocation message indicates for the terminal a time-frequency position of a shared channel where the data with the short time delay can be transmitted, and the fourth allocation message indicates for the terminal a time-frequency position of a shared channel where the common data can be transmitted.

In some embodiments, the first transmitting circuitry 301, the first receiving circuitry 302, the second transmitting circuitry 303, the second receiving circuitry 304, the third transmitting circuitry 305, the third receiving circuitry 307, the fourth transmitting circuitry 308, the fourth receiving circuitry 309 and the fifth transmitting circuitry 310 may be a wireless transceiver, and the determining circuitry 306 may be a processor, such as a CPU, an MCU or a DSP.

Figure 4:
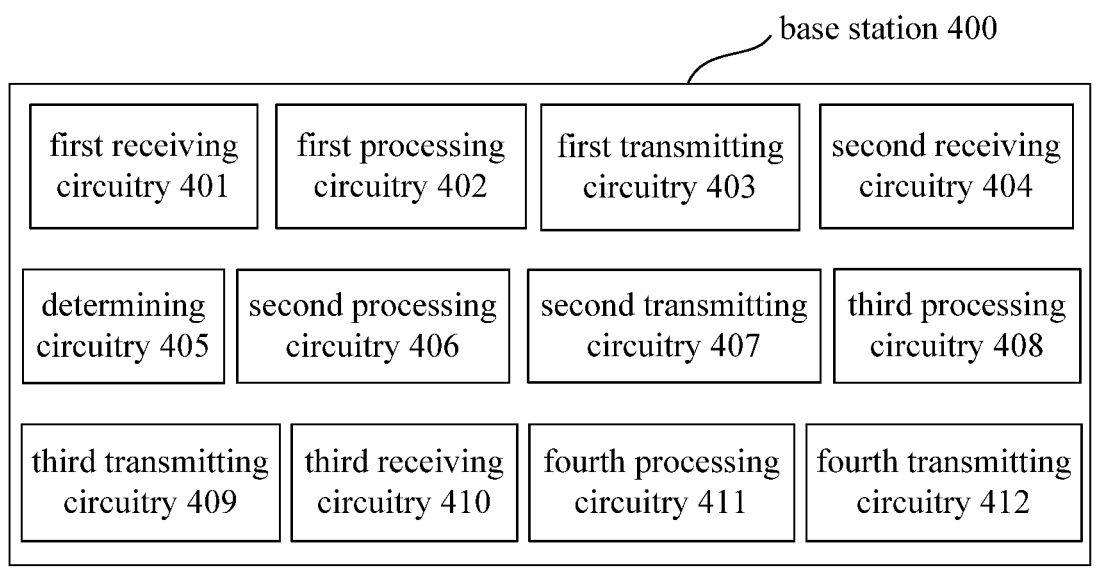
FIG. 4 schematically illustrates a structural diagram of a base station according to an embodiment.

Accordingly, in an embodiment, a base station is provided. Referring to FIG. 4, the base station 400 may include: a first receiving circuitry 401 configured to receive an access request message from a terminal, wherein the access request message indicates that the terminal has a demand on transmitting data with a short time delay; a first processing circuitry 402 configured to generate a first allocation message based on the access request message, wherein the first allocation message includes information of a first SR resource for transmitting a SR of the data with the short time delay; a first transmitting circuitry 403 configured to transmit the first allocation message to the terminal; a second receiving circuitry 404 configured to receive a SR from the terminal; a determining circuitry 405 configured to determine whether the SR is transmitted using the first SR resource; a second processing circuitry 406 configured to: if it is determined that the SR is transmitted using the first SR resource, allocate a resource for transmitting the data with the short time delay to the terminal, and generate a second allocation message including the allocated resource for transmitting the data with the short time delay; and a second transmitting circuitry 407 configured to transmit the second allocation message to the terminal.

In some embodiments, the first allocation message may further include information of a second SR resource that is used for transmitting a SR of common data.

In some embodiments, the first or second SR resource may include a transmission time-frequency position, a subframe offset and a period of the corresponding SR.

In some embodiments, the base station 400 may further include: a third processing circuitry 408 configured to: if it is determined that the SR received from the terminal is transmitted using the second SR resource, generate a third allocation message including information of a resource for transmitting a BSR; a third transmitting circuitry 409 configured to transmit the third allocation message to the terminal; a third receiving circuitry 410 configured to receive the BSR from the terminal, wherein the BSR indicates a service type of the common data to be transmitted by the terminal; a fourth processing circuitry 411 configured to generate a fourth allocation message based on the BSR, wherein the fourth allocation message includes information of a resource for transmitting the common data; and a fourth transmitting circuitry 412 configured to transmit the fourth allocation message to the terminal.

In some embodiments, data which requires a time delay shorter than or equal to 20 ms are called the data with the short time delay. In some embodiments, the common data may include uplink data and D2D data which has no requirements on time delay, and the data with the short time delay may include D2D data which requires a short time delay.

In some embodiments, the information of the first SR resource includes a first period which is a period of transmitting a SR using the first SR resource, the information of the second SR resource includes a second period which is a period of transmitting a SR using the second SR resource, and the first period is shorter than the second period.

In some embodiments, the first processing circuitry 402 may allocate a time-frequency position of the second SR resource in a field sr-PUCCH-ResourceIndex of a signaling SchedulingRequestConfig, and a sub-frame offset and a period of the second SR resource in a field sr-ConfigIndex of the signaling SchedulingRequestConfig, to complete the allocation of the second SR resource. The fields sr-PUCCH-ResourceIndex and sr-ConfigIndex are existing fields.

In some embodiments, the first processing circuitry 402 may allocate the first SR resource by adding two new fields in the signaling SchedulingRequestConfig, one for carrying a time-frequency position of the first SR resource, and the other for carrying a sub-frame offset and a period of the first SR resource. It should be noted that, methods for configuring the first SR resource are limited thereto. In some embodiments, fields of other signaling may be used to allocate the first SR resource by the first processing circuitry 402.

In some embodiments, the access request message may be an RRC connection setup request message or an RRC reconfiguration request message.

In some embodiments, if the access request message received by the first receiving circuitry 401 indicates that the terminal does not have the demand on transmitting the data with the short time delay, the first allocation message generated by the first processing circuitry 402 only includes the information of the second SR resource.

In some embodiments, the second or fourth allocation message may be a PDCCH indication message. The second allocation message indicates for the terminal a time-frequency position of a shared channel where the data with the short time delay can be transmitted, and the fourth allocation message indicates for the terminal a time-frequency position of a shared channel where the common data can be transmitted.

In some embodiments, if the data to be transmitted by the terminal is uplink data, the shared channel may be a PUCCH; or if the data to be transmitted by the terminal is D2D data, the shared channel may be a PSCH.

In some embodiments, the first receiving circuitry 401, the first transmitting circuitry 403, the second receiving circuitry 404, the second transmitting circuitry 407, the third transmitting circuitry 409, the third receiving circuitry 410 and the fourth transmitting circuitry 412 may be a wireless transceiver, and the first processing circuitry 402, the determining circuitry 405, the second processing circuitry 406, the third processing circuitry 408 and the fourth processing circuitry 411 may be a processor, such as a CPU, an MCU or a DSP.

From above, in the methods, the terminal device and the base station provided in the embodiments of the present disclosure, the terminal informs the base station that it has a demand on transmitting data with a short time delay through the access request message. The base station allocates the first SR resource for transmitting the SR of the data with the short time delay to the terminal based on the access request message. If the terminal transmits a SR using the first SR resource, the base station can determine that data to be transmitted by the terminal is the data with the short time delay, and directly allocates the resource for transmitting the data with the short time delay to the terminal. In this way, when data to be transmitted is data with a short time delay, interaction between a base station and a terminal during resource scheduling may be reduced to decrease a time delay in data transmission.

Further, the first period corresponding to the first SR resource is short than the second period corresponding to the second SR resource. Accordingly, the terminal transmits the SR of the data with the short time delay more rapidly than the SR of the common data, which may further reduce a time delay in the scheduling.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for scheduling communication resource, comprising:
   a terminal transmitting an access request message to a base station, wherein the access request message indicates that the terminal has a demand on transmitting data with a short time delay;
   receiving a first allocation message from the base station, wherein the first allocation message is generated based on the access request message and comprises information of a first scheduling request resource and information of a second scheduling request resource, wherein the first scheduling request resource is used for transmitting a scheduling request of the data with the short time delay, and the second scheduling request resource is used for transmitting a scheduling request of common data;
   determining whether data to be transmitted is the data with the short time delay or the common data;
   if it is determined that the data to be transmitted is the data with the short time delay, transmitting the scheduling request of the data with the short time delay to the base station using the first scheduling request resource; receiving a second allocation message from the base station, wherein the second allocation message comprises information of a resource for transmitting the data with the short time delay which is allocated by the base station, and is generated depending only on the base station determining that the first scheduling request resource has been used to transmit the scheduling request by the terminal; and transmitting the data with the short time delay based on the resource allocated in the second allocation message; and
   if it is determined that the data to be transmitted is the common data, transmitting a scheduling request of the common data to the base station using the second scheduling request resource.

2. The method according to claim 1, wherein the information of the first scheduling request resource comprises a first period which is a period of transmitting a schedule request using the first scheduling request resource, and the information of the second scheduling request resource comprises a second period which is a period of transmitting a schedule request using the second scheduling request resource, wherein the first period is shorter than the second period.

3. The method according to claim 1, further comprising:
    after transmitting the scheduling request of the common data to the base station using the second scheduling request resource, receiving a third allocation message from the base station, wherein the third allocation message is determined based on the second scheduling request resource and comprises information of a resource for transmitting a Buffer Status Report (BSR);
    transmitting the BSR to the base station based on the third allocation message, wherein the BSR indicates a service type of the common data to be transmitted by the terminal;
    receiving a fourth allocation message from the base station, wherein the fourth allocation message is generated based on the BSR and comprises information of a resource for transmitting the common data which is allocated by the base station; and
    transmitting the common data based on the resource allocated in the fourth allocation message.

4. A method for scheduling communication resource, comprising:
    receiving an access request message from a terminal, wherein the access request message indicates that the terminal has a demand on transmitting data with a short time delay;
    generating and transmitting a first allocation message to the terminal based on the access request message, wherein the first allocation message comprises information of a first scheduling request resource that is used for transmitting a scheduling request of the data with the short time delay, and information of a second scheduling request resource that is used for transmitting a scheduling request of common data;
    receiving a scheduling request from the terminal;
    if it is determined that the scheduling request is transmitted using the first scheduling request resource, allocating a resource for transmitting the data with the short time delay to the terminal, and generating a second allocation message comprising the allocated resource for transmitting the data with the short time delay; and transmitting the second allocation message to the terminal; and
    if it is determined that the scheduling request received from the terminal is transmitted using the second scheduling request resource, generating and transmitting a third allocation message to the terminal, wherein the third allocation message comprises information of a resource for transmitting a Buffer Status Report (BSR).

5. The method according to claim 4, wherein the information of the first scheduling request resource comprises a first period which is a period of transmitting a schedule request using the first scheduling request resource, and the information of the second scheduling request resource comprises a second period which is a period of transmitting a schedule request using the second scheduling request resource, wherein the first period is shorter than the second period.

6. The method according to claim 4, further comprising:
    after transmitting the third allocation message to the terminal, receiving the BSR from the terminal, wherein the BSR indicates a service type of the common data to be transmitted by the terminal; and
    generating and transmitting a fourth allocation message to the terminal based on the BSR, wherein the fourth allocation message comprises information of a resource for transmitting the common data.

7. A terminal device, comprising:
    a first transmitting circuitry configured to transmit an access request message to a base station, wherein the access request message indicates that the terminal device has a demand on transmitting data with a short time delay;
    a first receiving circuitry configured to receive a first allocation message from the base station, wherein the first allocation message is generated based on the access request message and comprises information of a first scheduling request resource and information of a second scheduling request resource, wherein the first scheduling request resource is used for transmitting a scheduling request of the data with the short time delay, and the second scheduling request resource is used for transmitting a scheduling request of common data;
    a determining circuitry configured to determine whether data to be transmitted is the data with the short time delay or the common data;
    a second transmitting circuitry configured to: if it is determined that the data to be transmitted is the data with the short time delay, transmit a scheduling request of the data with the short time delay to the base station using the first scheduling request resources and if it is determined that the data to be transmitted is the common data, transmit a scheduling request of the common data to the base station using the second scheduling request resource;
    a second receiving circuitry configured to receive a second allocation message from the base station, wherein the second allocation message comprises information of a resource for transmitting the data with the short time delay which is allocated by the base station, and is generated depending only on the base station determining that the first scheduling request resource has been used to transmit the scheduling request by the terminal; and
    a third transmitting circuitry configured to transmit the data with the short time delay based on the resource allocated in the second allocation message.

8. The terminal device according to claim 7, wherein the information of the first scheduling request resource comprises a first period which is a period of transmitting a schedule request using the first scheduling request resource, and the information of the second scheduling request resource comprises a second period which is a period of transmitting a schedule request using the second scheduling request resource, wherein the first period is shorter than the second period.

9. The terminal device according to claim 7, further comprising:
    a third receiving circuitry configured to: after the scheduling request of the common data is transmitted to the base station using the second scheduling request resource, receive a third allocation message from the base station, wherein the third allocation message is determined based on the second scheduling request resource and comprises information of a resource for transmitting a Buffer Status Report (BSR);
    a fourth transmitting circuitry configured to transmit the BSR to the base station based on the third allocation message, wherein the BSR indicates a service type of the common data to be transmitted by the terminal device;
    a fourth receiving circuitry configured to receive a fourth allocation message from the base station, wherein the fourth allocation message is generated based on the BSR and comprises information of a resource for transmitting the common data which is allocated by the base station; and
a fifth transmitting circuitry configured to transmit the common data based on the resource allocated in the fourth allocation message.

10. A base station, comprising:
a first receiving circuitry configured to receive an access request message from a terminal, wherein the access request message indicates that the terminal has a demand on transmitting data with a short time delay;
a first processing circuitry configured to generate a first allocation message based on the access request message, wherein the first allocation message comprises information of a first scheduling request resource that is used for transmitting a scheduling request of the data with the short time delay, and information of a second scheduling request resource that is used for transmitting a scheduling request of common data;
a first transmitting circuitry configured to transmit the first allocation message to the terminal;
a second receiving circuitry configured to receive a scheduling request from the terminal;
a determining circuitry configured to determine whether the scheduling request is transmitted using the first scheduling request resource;
a second processing circuitry configured to: if it is determined that the scheduling request is transmitted using the first scheduling request resource, allocate a resource for transmitting the data with the short time delay to the terminal, and generate a second allocation message comprising the allocated resource for transmitting the data with the short time delay;
a second transmitting circuitry configured to transmit the second allocation message to the terminal;
a third processing circuitry configured to: if it is determined that the scheduling request received from the terminal is transmitted using the second scheduling request resource, generate a third allocation message comprising information of a resource for transmitting a Buffer Status Report (BSR); and
a third transmitting circuitry configured to transmit the third allocation message to the terminal.

11. The base station according to claim 10, wherein the information of the first scheduling request resource comprises a first period which is a period of transmitting a schedule request using the first scheduling request resource, and the information of the second scheduling request resource comprises a second period which is a period of transmitting a schedule request using the second scheduling request resource, wherein the first period is shorter than the second period.

12. The base station according to claim 10, further comprising:
a third receiving circuitry configured to: after the third allocation message is transmitted to the terminal, receive the BSR from the terminal, wherein the BSR indicates a service type of the common data to be transmitted by the terminal;
a fourth processing circuitry configured to generate a fourth allocation message based on the BSR, wherein the fourth allocation message comprises information of a resource for transmitting the common data; and
a fourth transmitting circuitry configured to transmit the fourth allocation message to the terminal.

* * * * *